US011988505B2

(12) United States Patent
McKinster

(10) Patent No.: US 11,988,505 B2
(45) Date of Patent: May 21, 2024

(54) TAPE MEASURE WITH LIGHT

(71) Applicant: Milwaukee Electric Tool Corporation, Brookfield, WI (US)

(72) Inventor: Scott Earl McKinster, Watertown, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/932,579

(22) Filed: Sep. 15, 2022

(65) Prior Publication Data

US 2023/0076231 A1 Mar. 9, 2023

Related U.S. Application Data

(63) Continuation of application No. PCT/US2022/075917, filed on Sep. 2, 2022.

(60) Provisional application No. 63/240,450, filed on Sep. 3, 2021.

(51) Int. Cl.
*G01B 3/10* (2020.01)
*G01B 3/1084* (2020.01)

(52) U.S. Cl.
CPC ........ *G01B 3/10* (2013.01); *G01B 2003/1087* (2013.01)

(58) Field of Classification Search
CPC . G01B 3/10; G01B 3/1061; G01B 2003/1087
USPC .......................................................... 33/760
See application file for complete search history.

(56) References Cited

U.S. PATENT DOCUMENTS

| | | | | |
|---|---|---|---|---|
| 2,992,487 | A * | 7/1961 | Miller | G01B 3/1041 242/405 |
| 4,164,816 | A | 8/1979 | Bergkvist | |
| 4,462,160 | A * | 7/1984 | Cohen | G01B 3/1005 33/760 |
| 4,580,347 | A | 4/1986 | McKnight | |
| 5,430,952 | A * | 7/1995 | Betts | G01B 3/1084 33/760 |
| 7,174,655 | B1 * | 2/2007 | Gibbons | G01B 3/1084 33/759 |
| 7,536,804 | B2 | 5/2009 | Chang | |
| 7,549,235 | B2 * | 6/2009 | Alders | G01B 3/1084 33/760 |
| 8,516,713 | B2 | 8/2013 | Carl | |

(Continued)

FOREIGN PATENT DOCUMENTS

| | | |
|---|---|---|
| CN | 2124583 | 12/1992 |
| CN | 200993561 | 12/2007 |

(Continued)

OTHER PUBLICATIONS

International Search Report and Written Opinion for International Application No. PCT/US2022/075917, dated Dec. 21, 2022, 11 pages.

*Primary Examiner* — George B Bennett
(74) *Attorney, Agent, or Firm* — Reinhart Boerner Van Deuren s.c.

(57) ABSTRACT

A tool such as a tape measure, including a lighting system is shown. The lighting system includes a light source configured to direct light forward and strong enough to act as a flashlight. The tape measure further includes a housing designed to be compact and rugged enough to protect the internal components related to the lighting system from coming loose or suffering damage due to an impact or vibrations.

20 Claims, 11 Drawing Sheets

(56) References Cited

U.S. PATENT DOCUMENTS

| | | | |
|---|---|---|---|
| 9,046,340 B2* | 6/2015 | Li | G01S 17/88 |
| 9,267,778 B2 | 2/2016 | Burch et al. | |
| 11,060,834 B1* | 7/2021 | Luck | G01B 3/1061 |
| 2004/0237326 A1 | 12/2004 | Wang | |
| 2009/0307920 A1* | 12/2009 | Schrage | G01B 3/1041 |
| | | | 33/760 |
| 2012/0275144 A1* | 11/2012 | Foster | G01B 3/1084 |
| | | | 29/428 |
| 2013/0185949 A1* | 7/2013 | Burch | G01B 3/1061 |
| | | | 33/768 |
| 2014/0090264 A1* | 4/2014 | Li | G01B 3/10 |
| | | | 33/760 |
| 2019/0234723 A1 | 8/2019 | Li | |
| 2022/0316850 A1* | 10/2022 | Kang | F21V 23/007 |

FOREIGN PATENT DOCUMENTS

| | | |
|---|---|---|
| CN | 200993563 | 12/2007 |
| CN | 101294786 | 10/2008 |
| CN | 201229154 | 4/2009 |
| CN | 201463770 | 5/2010 |
| CN | 201522242 | 7/2010 |
| CN | 201548140 | 8/2010 |
| CN | 201795738 | 4/2011 |
| CN | 201803650 | 4/2011 |
| CN | 202284932 | 6/2012 |
| CN | 202303124 | 7/2012 |
| CN | 202361904 | 8/2012 |
| CN | 202432941 | 9/2012 |
| CN | 202485575 | 10/2012 |
| CN | 102878880 | 1/2013 |
| CN | 203928927 | 11/2014 |
| CN | 204924077 | 12/2015 |
| CN | 106500555 | 3/2017 |
| CN | 206113789 | 4/2017 |
| CN | 107144195 | 9/2017 |
| CN | 207600325 | 7/2018 |
| DE | 20214428 | 12/2002 |
| KR | 10-2225168 | 3/2021 |
| WO | WO16048125 | 3/2016 |

* cited by examiner

TAPE MEASURE WITH LIGHT

CROSS-REFERENCE TO RELATED PATENT APPLICATION

The present application is a continuation of International Application No. PCT/US2022/075917, filed Sep. 2, 2022, which claims the benefit of and priority to U.S. Provisional Application No. 63/240,450, filed on Sep. 3, 2021, which are incorporated herein by reference in their entireties.

BACKGROUND OF THE INVENTION

The present invention relates generally to the field of tools. The present invention relates specifically to a tape measure, measuring tape, retractable rule, etc., that includes a light.

SUMMARY OF THE INVENTION

One embodiment of the invention relates to a tape measure. The tape measure includes a housing, a reel rotatably disposed in the housing, an elongate blade located within the housing and wound around the reel, and a retraction system coupled to the reel. The retraction system drives rewinding of the elongate blade on the reel. The tape measure further includes a lighting system. The lighting system includes a circuit board, a light source, a frame and an optical component. The optical component at least partially surrounds the light source and is positioned between an outward facing surface of the frame and the circuit board. The frame is configured to surround the and support the circuit board, the light source and the optical component within the housing. The lighting system is configured to emit a light in a forward direction such that the lighting system acts as a flashlight.

Another embodiment of the invention relates to a tape measure. The tape measure includes a housing, a reel rotatably disposed in the housing, an elongate tape having gradation marks located within the housing and wound around the reel, and a tape port in the housing allowing for the extension of the elongate tape away from the housing in a forward direction. The tape measure further includes a spring coupled to the reel. The extension of the elongate tape causes rotation of the reel which tensions the spring storing energy within the spring and the spring releases energy driving the reel to retract and wind the elongate tape on the reel. The tape measure includes a lighting system. The lighting system includes a circuit board, a light-emitting diode, an optical component, and a holder. The optical component at least partially surrounds the light-emitting diode. The holder is configured to surround the and support the circuit board, the light-emitting diode and the optical component within the housing. The lighting system emits a light in the forward direction and illuminates the elongate tape.

Another embodiment of the invention relates to a tape measure. The tape measure includes a housing with a recess on a front portion of the housing and a body of the housing formed from a first material having a first durometer. A portion of the housing surrounding the recess is formed from a second material having a second durometer less than the first durometer. The tape measure further includes an axle coupled to the housing, a tape reel rotatably mounted within the housing around the axle and defining an axis of rotation. The tape reel includes a radially outward facing surface. An elongate tape blade is wound around the radially outward facing surface of the tape reel. The tape measure includes a retraction system is coupled to the tape reel and a lighting system. The retraction system drives rewinding of the elongate tape blade on to the tape reel. The lighting system includes a circuit board, a light-emitting diode, a frame, and an optical component. The optical component at least partially surrounds the light-emitting diode and is positioned between an outward facing surface of the frame and the circuit board. The outward facing surface of the frame is positioned in the recess of the housing. The frame is configured to surround and support the circuit board, the light-emitting diode and the optical component within the housing.

Another embodiment of the invention relates to a tape measure with a lighting system. The tape measure includes a housing with a recess on a front portion of the housing. The lighting system includes a frame, a circuit board, a light source and a reflector. The frame is configured to surround and support the circuit board, the light source and the reflector within the housing. The reflector at least partially surrounds the light source and is positioned between an outward facing surface of the frame and the circuit board. The outward facing surface of the frame is positioned in the recess of the housing. In various embodiment, the tape measure includes a rechargeable battery and wires that electronically couple the circuit board and the battery. The tape measure further includes a wire retention system configured to retain the wires adjacent to an inner surface of the housing. The wire retention system includes a plurality of curved walls with opposing inner surfaces. The plurality of curved walls define a plurality of channels configured to receive the wires. The wire retention system further includes a plurality of retaining ribs that extend outward from the inner surfaces of the curved walls to keep the wires within the plurality of channels.

Another embodiment of the invention relates to a tape measure with a lighting system. The tape measure includes a housing with a recess on a front portion of the housing. The lighting system includes a frame, a circuit board, a light source and a lens. The frame is configured to surround and receive the circuit board, the light source and the lens within the housing. The lens at least partially surrounds the light source and is positioned between an outward facing surface of the frame and the circuit board. The outward facing surface of the frame is positioned in the recess of the housing. In various embodiments, the tape measure includes a rechargeable battery and wires that electronically couple the circuit board and the battery. The tape measure further includes a wire retention system configured to retain the wires adjacent to an inner surface of the housing. The wire retention system includes a plurality of curved walls with opposing inner surfaces. The plurality of curved walls define a plurality of channels configured to receive the wires. The wire retention system further includes a plurality of retaining ribs that extend outward from the inner surfaces of the curved walls to keep the wires within the plurality of channels.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a tape measure are shown. Various embodiments of the tape measure discussed herein include an innovative lighting system. In contrast to the tape measure discussed herein, other tape measures may include a light that is only powerful enough to illuminate numbers on the tape blade. Applicant believes the lighting system described herein is configured to be strong enough to allow the tape measure to be used as a flashlight in addition to illuminating the tape blade. The tape measure further includes a charging system for a battery that powers the lighting system. The charging system includes an indicator light configured to easily update a user on the charging status of the battery as well as the remaining battery power when the light is in use.

Further, Applicant believes the housing design allows for robust protection of the internal systems of the tape measure including the lighting system, while maintaining a compact tape measure housing. For example, the housing is configured/shaped such that the lens is recessed relative to the housing and is surrounded by an impact absorbing material to protect the lens from direct impact if the tape measure is dropped. The material around the lens also creates a water and dust barrier that further protects the lens and lighting system.

In various embodiments, the tape measure includes a lanyard attachment. The position of the lanyard attachment allows for various improvements including a compact housing design that includes enough space internally for the lighting system components. The position of the lanyard attachment also allows for projection of the light downward and forward when the tape measure is carried by a lanyard. Additionally, the lanyard attachment placement allows for easier inside-dimension measuring using the tape measure (i.e., the bottom rear corner can be pressed into a corner of a workpiece) relative to a typical design in which the lanyard is attached at the bottom rear portion of a tape measure.

Figure 1:
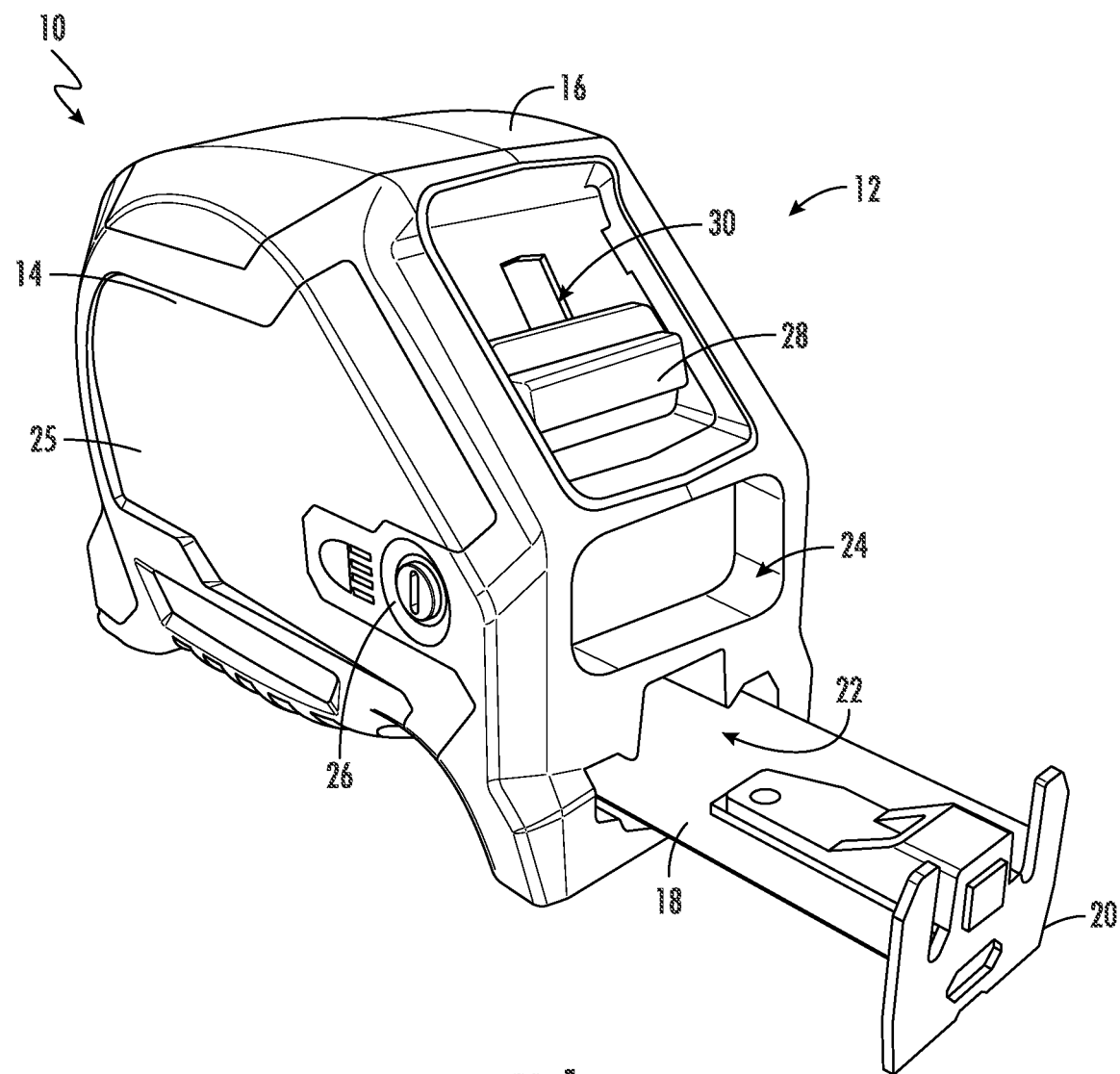
FIG. 1 is a perspective view of a tape measure including a lighting system, according to an exemplary embodiment.
Figure 2:
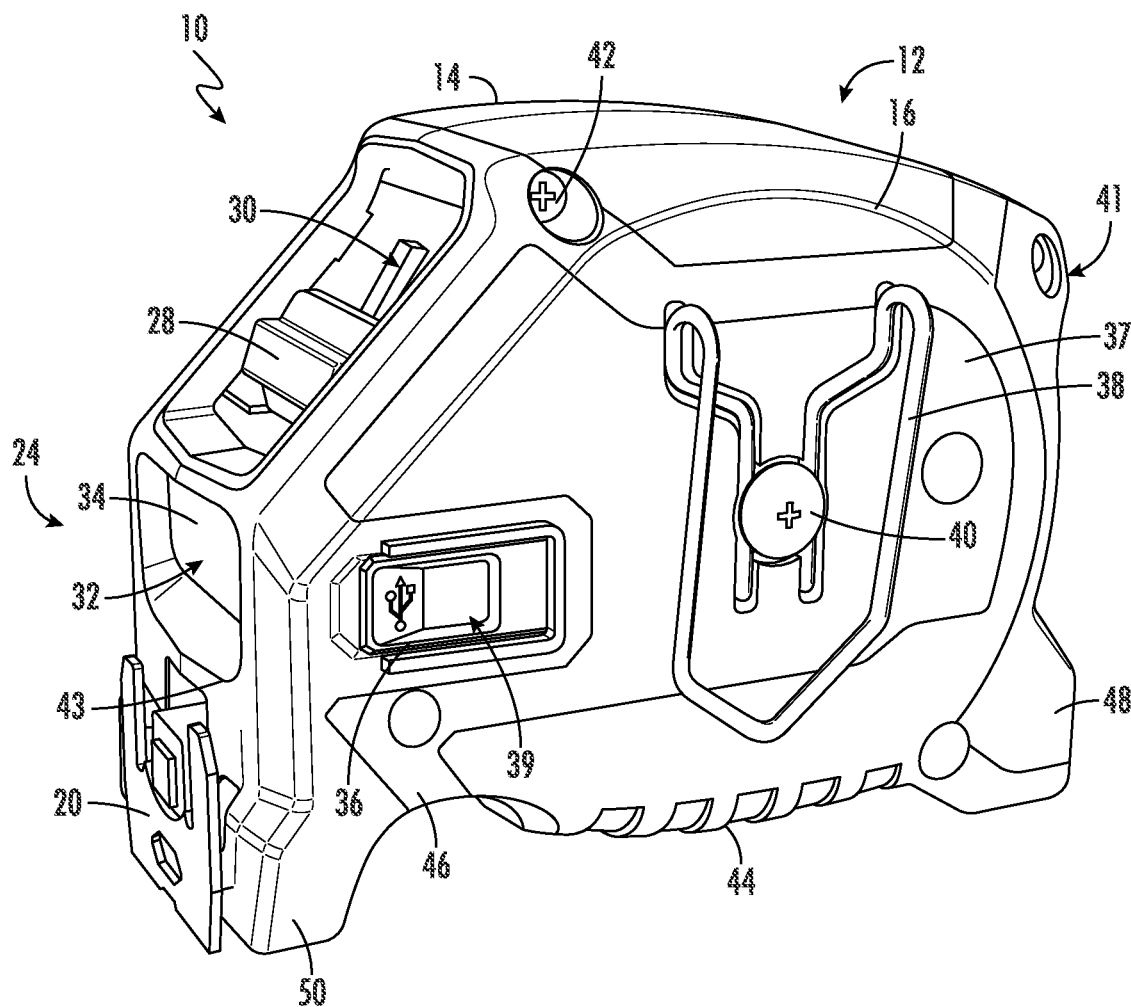
FIG. 2 is a right-side perspective view of the tape measure of FIG. 1, according to an exemplary embodiment.
Figure 10:
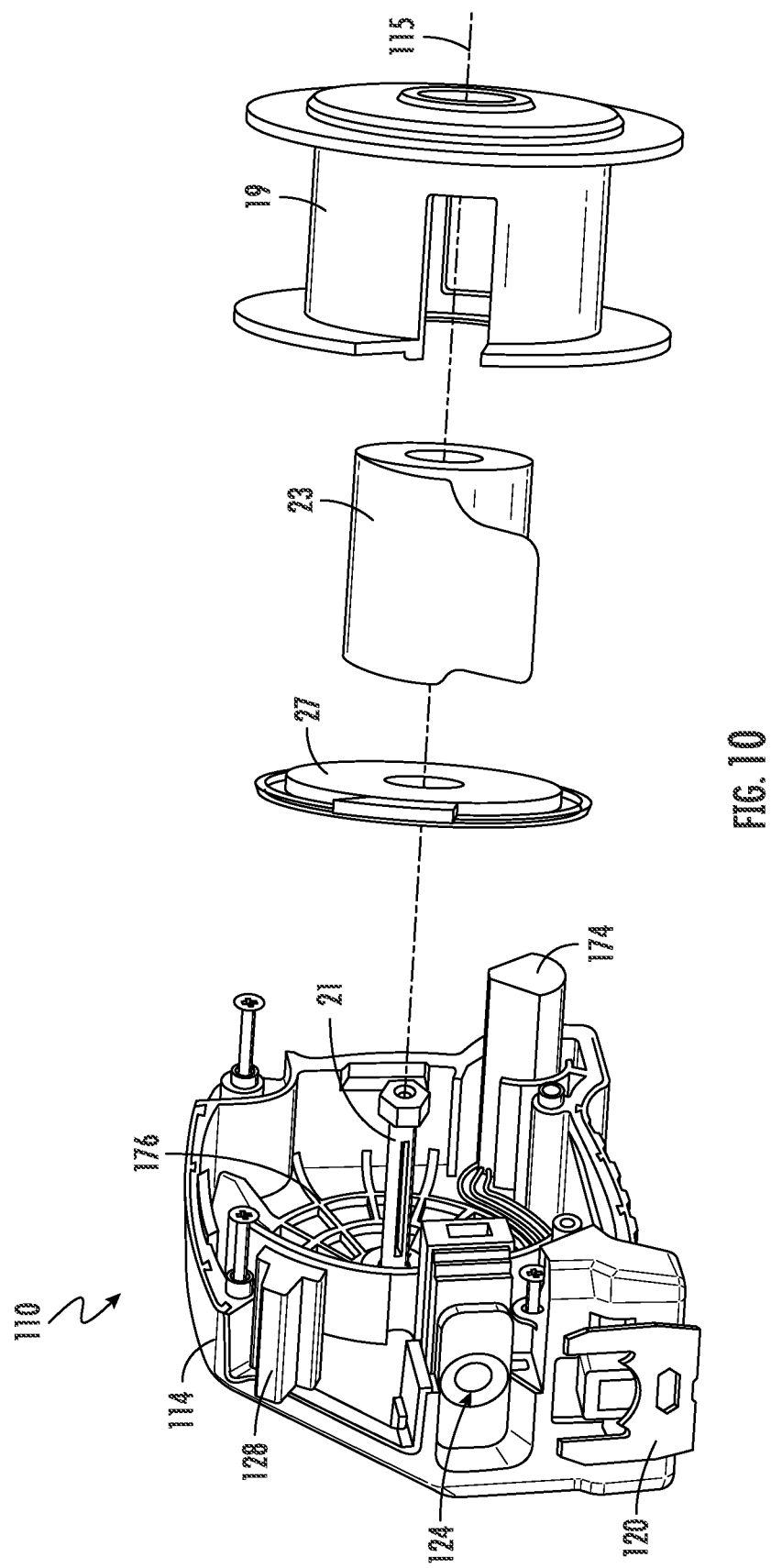
FIG. 10 is an exploded view of the tape measure of FIG. 8 with a first portion of the housing removed, according to an exemplary embodiment.

Referring to FIGS. 1-2 and 10, a length measurement device, such as tape measure 10, is shown according to an exemplary embodiment. In general, tape measure 10 includes a housing 12 having a first part 14 and a second part 16. Tape measure 10 includes an elongate strip of material (e.g., steel material) shown as tape blade 18 that includes an outer most end coupled to a hook assembly, shown as hook assembly 20. Tape blade 18 may include various coatings (e.g., polymer coating layers) to help protect tape blade 18 and/or the graduated markings of the blade. In the retracted position shown in FIG. 2, tape blade 18 is wound or coiled onto a reel, shown as tape reel 19 that is rotatably disposed in housing 12. Specifically, tape reel 19 includes a radially outward facing surface and tape blade 18 is wound around the radially outward facing surface of tape reel 18. In general, the tape reel 19 rotatably mounted to an axle or post 21 that is supported from housing 12. In one embodiment, the post 21 is rigidly connected (i.e., rotationally fixed) relative to housing 12, and in another embodiment, the post 21 is rotatably connected to housing 12 such that the post 21 is allowed to rotate relative to housing 12 during tape extension or retraction.

Tape measure 10 includes a retraction system or mechanism that drives the rewinding of tape blade 18 on to tape reel 19. In a specific embodiment, the retraction system includes a spring 23 (see e.g., FIG. 10) that is coiled or wound to store energy during extension of tape blade 18 from housing 12 and is unwound, releasing energy, driving rewinding of tape blade 18 onto the tape reel 19 during retraction of tape blade 18 (e.g., following release or unlocking of tape blade 18). In a specific embodiment, the spring 23 is positioned and mounted within the tape reel 19. In another embodiment, the retraction system may include a motor (e.g., an electric motor) and a power source (e.g., a battery) that drives the retraction of the tape reel 19.

Referring to FIG. 1, a tape lock 28 is provided to selectively engage tape blade 18, which acts to hold tape blade 18 and reel in place such that an extended segment of tape blade 18 remains at a desired length. A slot 30 is defined along a forward portion of housing 12. Slot 30 provides an opening in housing 12 which allows tape lock 28 to extend into housing 12 and to engage with tape blade 18 or reel. In addition, slot 30 provides a length sufficient to allow tape lock 28 to be moved relative to housing 12 between locked and unlocked positions.

Below slot 30, a tape port 22 is provided in housing 12. Tape port 22 allows for the retraction and extension of tape blade 18 into and from housing 12 during tape extension and retraction.

Tape measure 10 further includes a light system or assembly 24. Light system 24 includes a power button 26 on a side surface 25 of first part 14 of housing 12. Light system 24 includes a holder 56 (see e.g., FIG. 4) that surrounds and supports at least a portion of light system 24. Holder 56 includes an outward facing surface 34 positioned in a recess 32 of housing 12. Recess 32 provides additional protection for light system 24 if tape measure 10 is dropped, avoiding direct impact to internal components of light system 24. In a specific embodiment, holder 56 is formed from a thermoplastic material. In a specific embodiment, holder 56 is formed from a clear polycarbonate material. Further, the portion of housing 12 surrounding recess 32 is formed from an impact absorbing material. In a specific embodiment, the impact absorbing material surrounding recess 32 is thermoplastic rubber (TPR).

In a specific embodiment, a body portion of housing 12 is formed from a first material and the portion of housing 12 surrounding recess 32 is formed from a second material. The body portion of housing 12 includes at least one of side surface 25, side surface 37, front foot 50 and/or rear foot 48. In a specific embodiment the second material is different from the first material. The second material has a property (e.g., durometer, modulus of elasticity, etc.) different than the property of the first material. In specific embodiments, the first material has a first durometer, and the second material has a second durometer less than the first durometer.

Referring to FIG. 2, a right-side perspective view of tape measure 10 is shown according to an exemplary embodiment. Second part 16 of housing 12 includes a side surface 37. Side surface 37 includes a charging port 36. Charging port 36 is part of a charging system 39 and is configured to charge a battery 74 (see e.g., FIG. 6). Side surface 37 further includes a clip 38 coupled to side surface 37 by a fastener shown as screw 40. Clip 38 is configured to attach to a narrow object such as a belt or tool bag. Second part 16 of housing 12 includes a plurality of bores 41 configured to receive fasteners, shown as screws 42 that removably couple second part 16 and first part 14 of housing 12 together.

Housing 12 further includes a front surface 43 extending between side surface 25 of first part 14 of housing 12 and side surface 37 of second part 16 of housing 12. Recess 32 is positioned along front surface 43 above tape port 22 and below tape lock 28. Recess 32 includes a width less than a width W1 of housing 12 (see e.g., FIG. 3), where the width of recess 32 is within plus or minus 25% of a width of tape port 22. In a specific embodiment, W1 is between 1.5 inches and 2.5 inches, specifically between 1.8 inches and 2.2 inches and more specifically between 1.9 inches and 2.1 inches. In such an embodiment, W1 is about 2.05 inches (i.e., 2.05 inches plus or minus 0.05 inches).

Below tape port 22, a front foot 50 of housing 12 extends downward, away from recess 32 and tape port 22. Housing 12 further includes a rear foot 48 opposing front foot 50. Under charging port 36, a curved portion 46 extending upward toward charging port 36 is provided in housing 12. Curved portion 46 is positioned between front foot 50 and rear foot 48 of housing 12. In a specific embodiment, a plurality of grip enhancing structures, shown as ridges 44 are positioned between curved portion 46 and rear foot 48.

Figure 3:
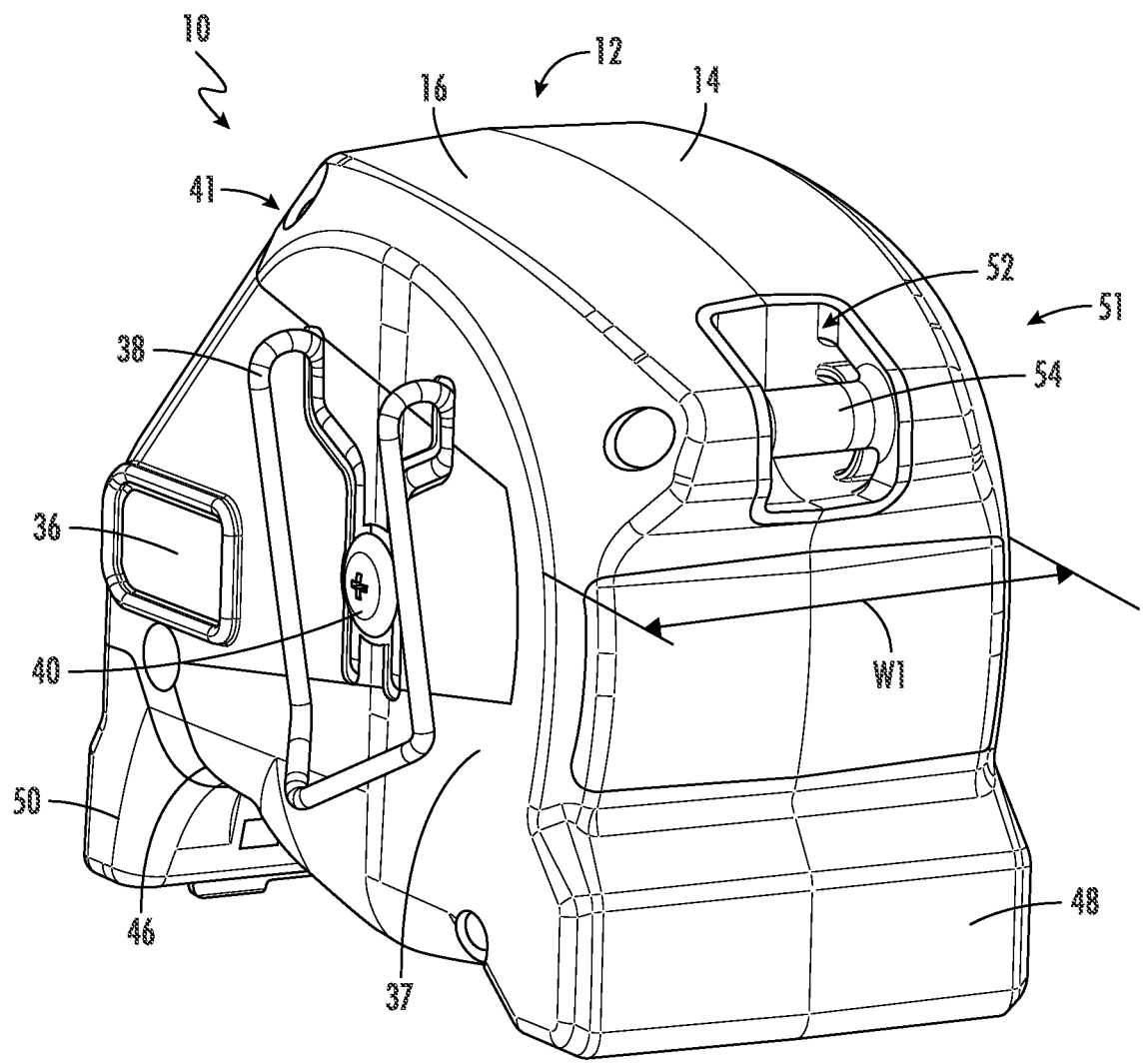
FIG. 3 is a rear perspective view of the tape measure of FIG. 1, according to an exemplary embodiment.

Referring to FIG. 3, a rear perspective view of tape measure 10 is shown according to an exemplary embodiment. In a specific embodiment, lanyard attachment assembly 51 is positioned at a top, rear corner of housing 12. The position of lanyard attachment assembly 51 allows for a more compact, robust design of the light system 24, as will be described in greater detail below. Lanyard attachment assembly 51 includes a lanyard attachment recess 52 and a lanyard post 54 extending across lanyard attachment recess 52. Housing 12 includes width W1 defined between side surface 25 of first part 14 of housing 12 and side surface 37 of second part 16 of housing 12. In a specific embodiment, W1 is sized to keep housing 12 compact and to allow for battery 74 (see e.g., FIG. 6) to be a AAA size. In another embodiment, the lanyard attachment assembly can be positioned at clip 38, such that the lanyard attachment is built into clip 38.

Figure 4:
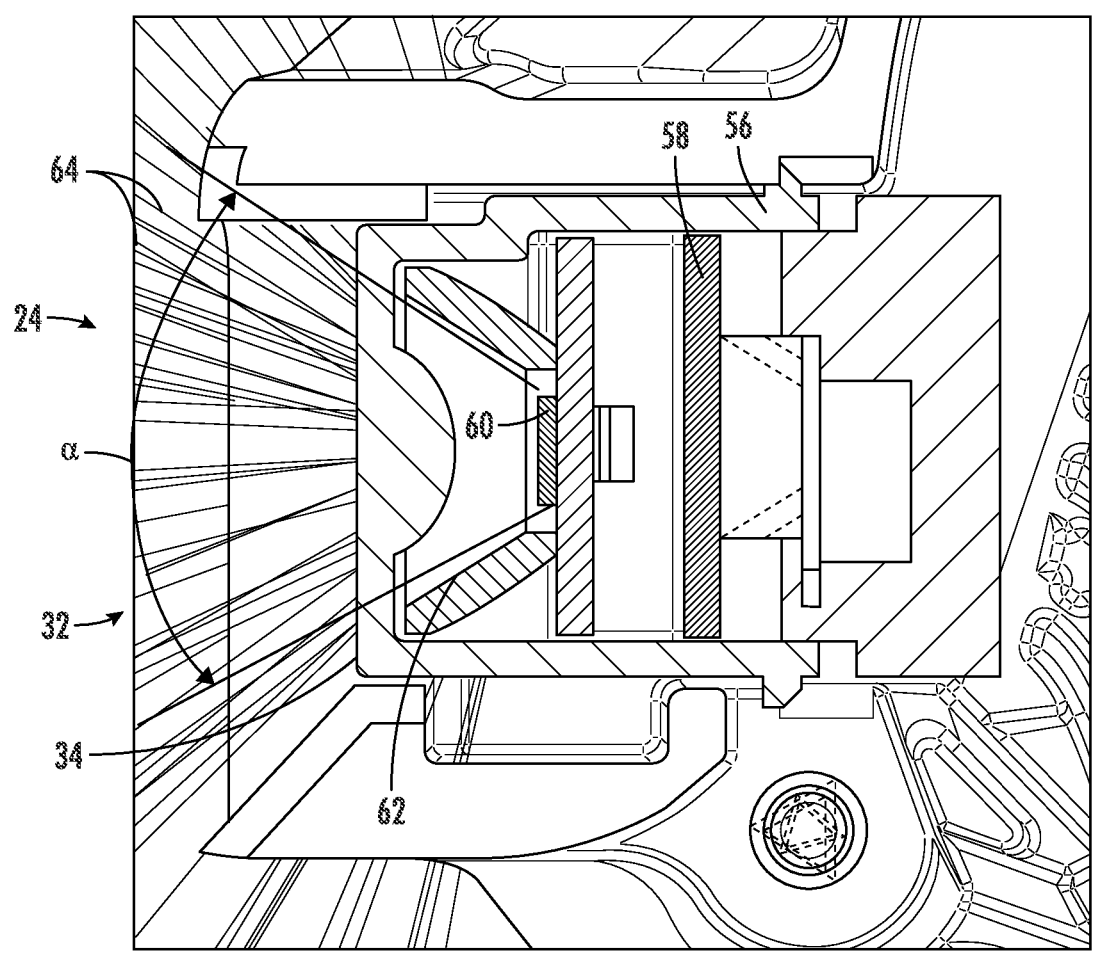
FIG. 4 is a cross-sectional perspective view of the lighting system of FIG. 1, according to an exemplary embodiment.
Figure 5:
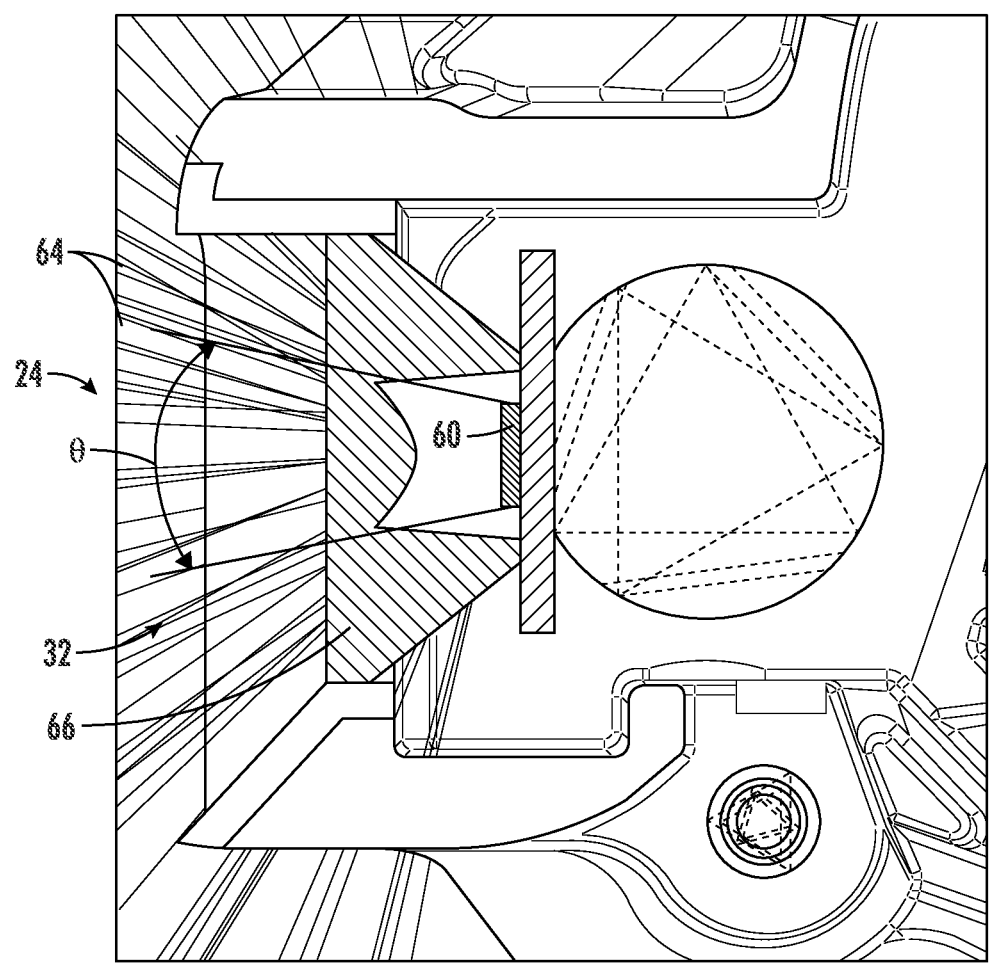
FIG. 5 is a cross-sectional perspective view of the lighting system of FIG. 1, according to an exemplary embodiment.

Referring to FIGS. 4-5, detailed cross-sectional perspective views of light system 24 are shown. Light system 24 is configured to emit a light directed in a forward direction, allowing tape measure 10 to act as a flashlight, while light system 24 also provides light for (i.e., illuminates) tape blade 18. The forward direction is the direction of tape blade 18 extension from the tape port 22. In one embodiment, light system 24 includes a frame, show as holder 56, a circuit board, shown as printed circuit board assembly (PCBA) 58, a light source, shown as light-emitting diode (LED) 60 and an optical component, shown as a reflector 62. Reflector 62 at least partially surrounds LED 60 and is positioned between outward facing surface 34 (see e.g., FIG. 2) of holder 56 and PCBA 58. Light 64 is shown extending from LED 60 out of housing 12 of tape measure 10.

Referring to FIG. 5, a cross-sectional view of another embodiment of light system 24 is shown. In a specific embodiment, light system 24 includes holder 56 (see e.g., FIG. 4), PCBA 58, LED 60 and an optical component, shown as a lens 66. In a specific embodiment, lens 66 is a total internal reflection (TIR) lens. Lens 66 at least partially surrounds LED 60 and is positioned between outward facing surface 34 (see e.g., FIG. 2) of holder 56 and PCBA 58. PCBA 58 is configured to ramp the power down to 50% after 1 minute of use to prevent LED 60 from overheating during use of tape measure 10 as a flashlight.

As shown in FIGS. 4-5, there are portions of the light that do not engage with reflector 62, such that a beam angle α is wider relative to a beam angle θ of the embodiment including lens 66. Using the full width at half maximum (FWHM) angle method, the intensity of the beam at the center is measured and the intensity of the beam moving away from the center is measured until the intensity of the beam reaches 50% of the center intensity. The angle at which the 50% intensity is measured is the half angle. The half angle is then multiplied by two to find the full width at half maximum angle. The FWHM angle of reflector 62 embodiment is defined as F1, and the FWHM angle of the lens 66 embodiment is defined as F2. In a specific embodiment, F1 is between 20° and 40°, specifically between 21° and 31° and more specifically between 25° and 31°. In such an embodiment, F1 is about 29.4° (e.g., 29.4° plus or minus 1°). In a specific embodiment, F2 is between 5° and 25°, specifically between 10° and 20° and more specifically between 11° and 17°. In such an embodiment, F2 is about 14.1° (e.g., 14.1° plus or minus 1°).

Charging system 39 further includes a status or indicator LED that acts as an indicator light for charging and/or current status of battery 74. The status LED is positioned within lens 66 or reflector 62 along with the main LED 60. The status LED is configured to change colors and to either pulse or remain steadily lit depending on the circumstances (i.e., the charge level of battery 74). When charging, the status LED is a pulsing red when battery 74 is between 0% and 49% charged, a pulsing yellow when battery 74 is between 50% and 99% charged and a steady green when battery 74 is 100% charged. When light system 24 is in use, the status LED holds a steady green when battery 74 is between 100% and 50% charged, a steady yellow when battery 74 is between 49% and 10% charged, a steady red when battery 74 is between 9% and 3% charged and a flashing red when battery 74 is less than 3% charged.

Figure 6:
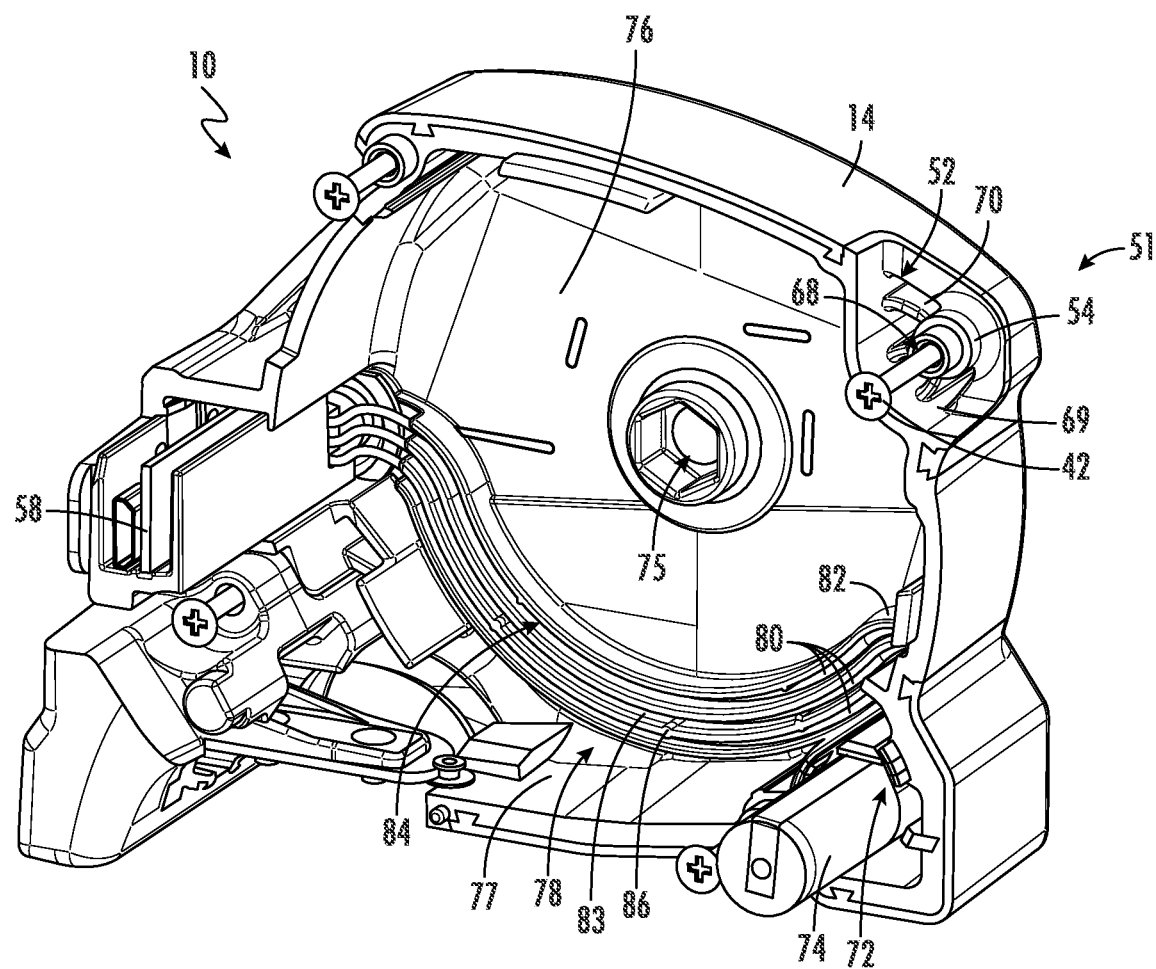
FIG. 6 is a perspective view of the tape measure of FIG. 1 with a first portion of the housing and internal tape measure components removed, according to an exemplary embodiment.
Figure 7:
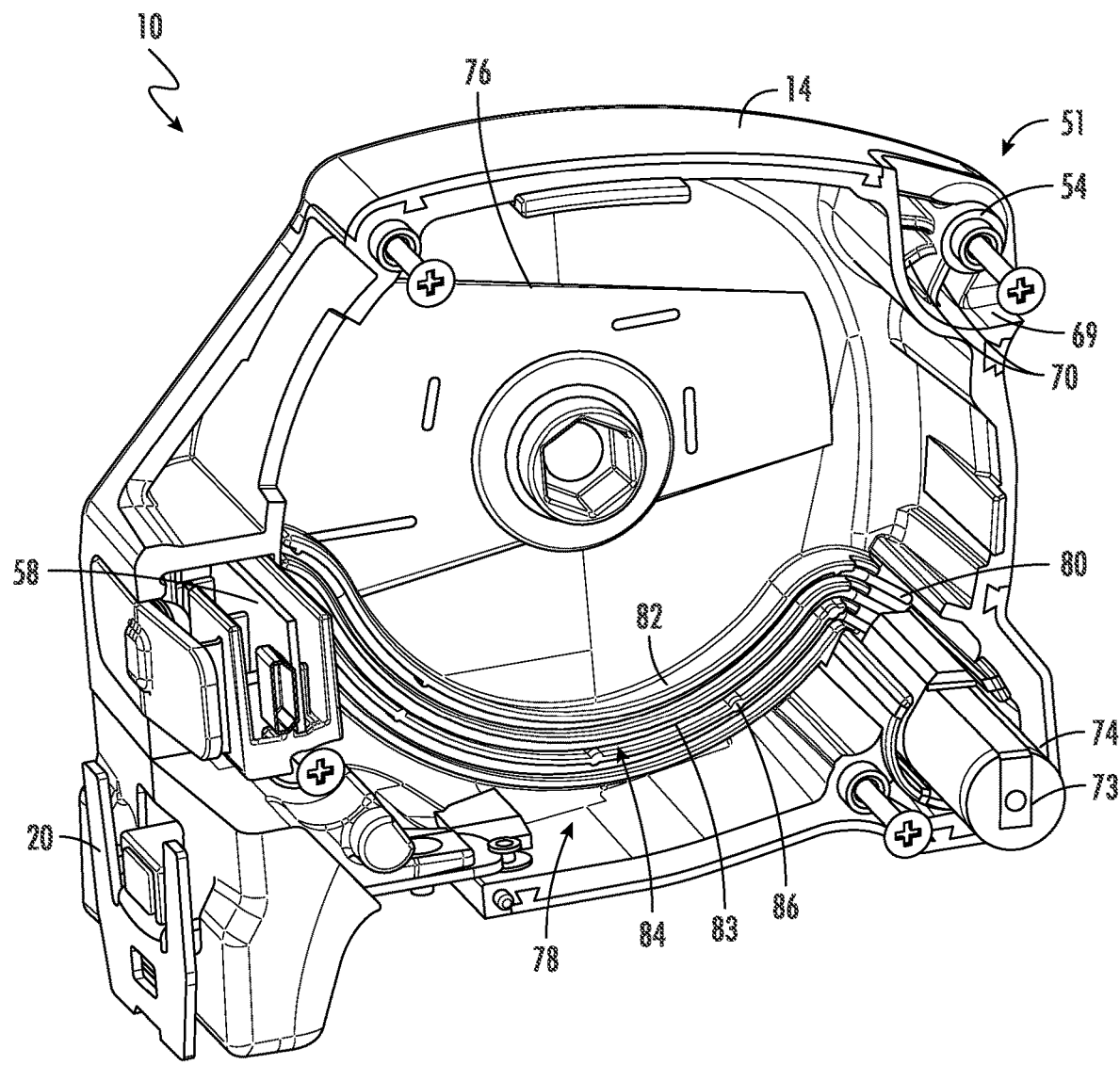
FIG. 7 is a perspective view of the tape measure of FIG. 1 with a first portion of the housing and internal tape measure components removed, according to an exemplary embodiment.

Referring to FIGS. 6-7, perspective views of tape measure 10 with second part 16 of housing 12 and the internal tape measure components removed are shown. First part 14 of housing 12 includes an inner surface 76. Inner surface 76 includes a recess 75 configured to receive the axle or post of tape measure 10. Lanyard post 54 includes a bore 68 configured to receive screw 42. Lanyard attachment assembly 51 further includes a plurality of support legs 70. Support legs 70 extend between lanyard post 54 and outward facing surface 69 of lanyard attachment recess 52.

As shown in FIG. 6, PCBA 58 is electronically coupled to LED 60 and connected to battery 74 by wires 80 that extend between PCBA 58 and/or LED 60 and battery 74. Battery 74 is positioned in a rear lower portion of housing 12 behind the reel of tape measure 10. Battery 74 is received within a cylindrical bore 72 and positioned in an orientation with a longitudinal axis of battery 74 parallel to the axle or post 21 of tape measure 10. Battery 74 is held in place by a battery holder or clip 73 (see e.g., FIG. 7).

Inner surface 76 is coupled to a wire retention system 78. Wire retention system 78 is designed to retain or secure the wires in a position adjacent to or against inner surface 76 to prevent rubbing against the internal tape measure components (e.g., tape reel 19, spring 23 etc.) that might damage wires 80 over time. The retention of the wires not only avoids wear, but also creates a more rugged tape measure 10. Wire retention system 78 prevents the wires from moving upon impact if tape measure 10 is dropped and prevents the jarring loose of the wires due to vibration of housing 12.

Wire retention system 78 includes a plurality of tracks, shown as curved walls 82, positioned below the tape reel 19 and shaped to extend around at least a portion of the tape reel 19. In particular, as shown in FIG. 6, curved walls 82 are located between lower wall 77 of housing 12 and recess 75 configured to receive the axle of tape measure 10. Curved walls 82 extend from the front portion of housing 12 adjacent to PCBA 58 to the rear portion of housing 12 where battery 74 is located. Wire retention system 78 further includes a plurality of channels 84 defined between the plurality of curved walls 82. Wires 80 are received within the plurality of channels 84 and extend between PCBA 58 and battery 74. Curved walls 82 include opposing inner surfaces 83 that face each other. Inner surfaces 83 of curved walls 82 include a plurality of retaining ribs 86 extending outward from the opposing inner surfaces 83 of the curved walls 82 such that the wires 80 are held within the channels 84. In a specific embodiment, retaining ribs 86 have a curved shape. Retaining ribs 86 help to secure wires 80 within channels 84 during impact events or when housing 12 vibrates.

Referring to FIG. 10, an exploded view of a tape measure showing the internal components of the tape measure are shown, according to an exemplary embodiment. Tape blade 118 is wound or coiled onto tape reel 19 which is rotatably mounted to axle or post 21 that is supported from inner surface 176 housing 112. Tape reel 19 is rotatable about an axis, shown as an axis of rotation 115. Post 21 and spring 23 extend along axis of rotation 115 when the tape measure is assembled. Spring 23 of the retraction system is positioned within the tape reel 19.

Figure 9:
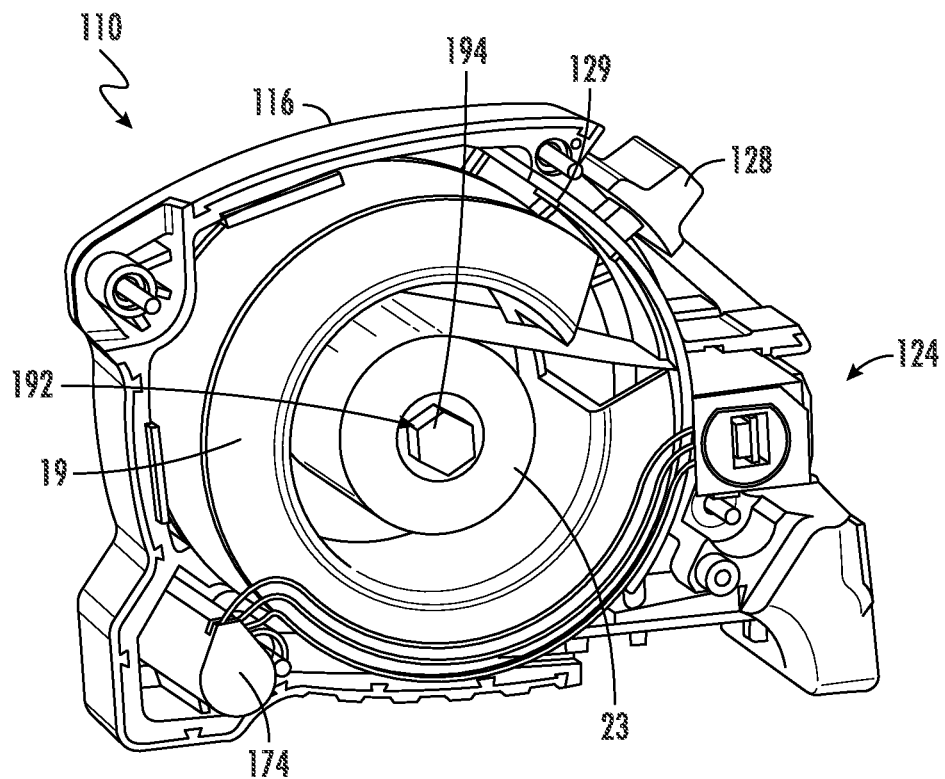
FIG. 9 is a perspective view of the tape measure of FIG. 8 with a second portion of the housing removed, according to an exemplary embodiment.

Referring to FIGS. 9-10 another embodiment of a length measurement device, shown as tape measure 110, is shown according to an exemplary embodiment. Tape measure 110 can be utilized with a light system such as light system 24. In general, tape measure 110 is substantially the same as tape measure 10 except for the differences discussed herein. As will be discussed in greater detail below, an improved wire retention system configured to retain the wires adjacent to an inner surface of the housing is included. Applicant believes the wire retention system reduces manufacturing costs (i.e., fewer parts and easier assembly) while maintaining durability or the tape measure.

Figure 8:
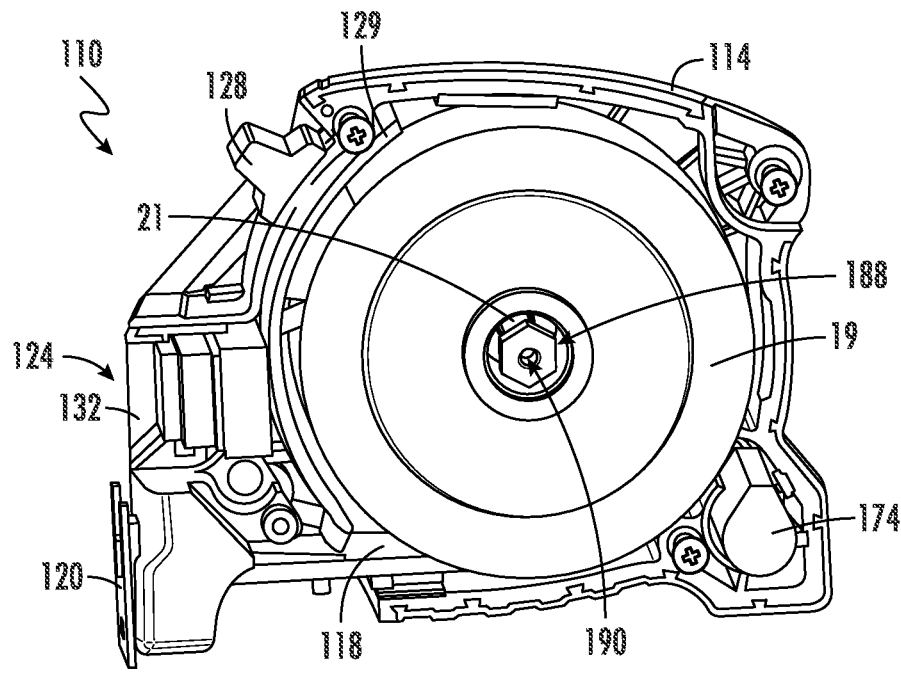
FIG. 8 is a perspective view of a tape measure of with a first portion of the housing removed, according to another exemplary embodiment.

Referring to FIGS. 8-9, perspective views of a tape measure 110 are shown with the internal tape measure components according to an exemplary embodiment. Post 21 includes a first end 188 and a second end 192 opposing first end 188. First end 188 of post 21 includes an opening 190 configured to receive a fastener (see e.g., 40 in FIG. 2) configured to retain a clip (see e.g., 38 in FIG. 2) on housing 112. Second end 192 of post 21 includes an extended portion 194 configured to be received within a recess 175 (see e.g., FIG. 11) on inner surface 176 of first part 114 of housing 112. In a specific embodiment, an end cap 27 is coupled to tape reel 19 and extends around post 21 and specifically second end 192 of post 21. In such an embodiment, end cap 27 is positioned along and/or coupled to inner surface 176 of first part 114 of housing 112.

Figure 11:
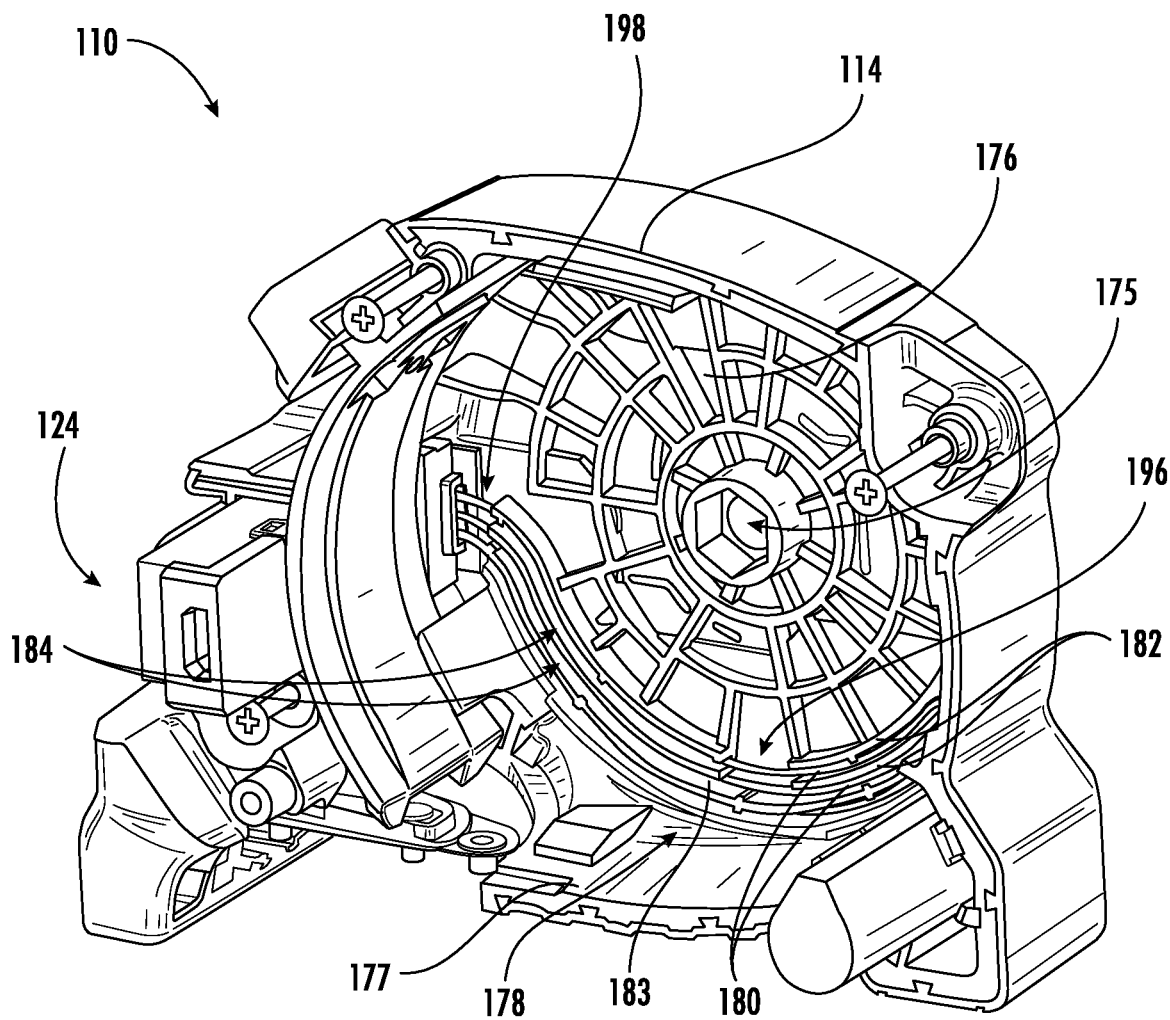
FIG. 11 is a perspective view of the tape measure of FIG. 8 with a first portion of the housing and internal tape measure components removed, according to an exemplary embodiment.
Figure 12:
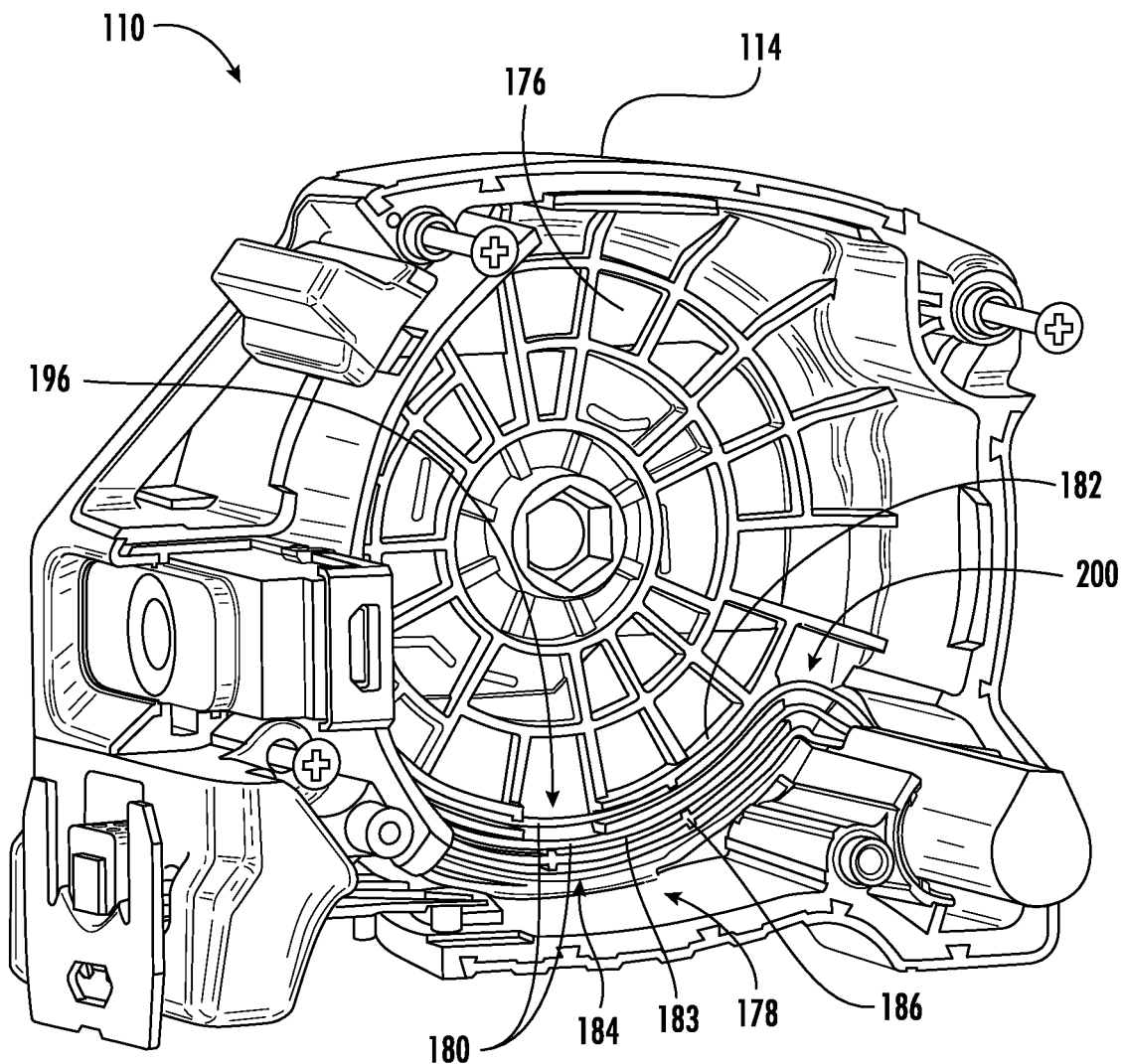
FIG. 12 is a perspective view of the tape measure of FIG. 8 with a first portion of the housing and internal tape measure components removed, according to an exemplary embodiment.

Referring to FIGS. 11-12, perspective views of tape measure 110 with second part 116 of housing 112 and the internal tape measure components removed are shown. First part 114 of housing 112 includes the inner surface 176 that is coupled to a wire retention system 178. Wire retention system 178 is designed to retain the wires against inner surface 176 to prevent rubbing against the internal tape measure components (e.g., tape reel 19, spring 23 etc.) that might damage wires 180 over time. The retention of the wires not only avoids wear, but also creates a more rugged tape measure 110. Wire retention system 178 prevents the wires from moving upon impact if tape measure 110 is dropped and prevents the jarring loose of the wires due to vibration of housing 112.

Wire retention system 178 includes a plurality of tracks, shown as curved walls 182, positioned below the tape reel 19 and shaped to extend around at least a portion of the tape reel 19. In particular, curved walls 182 are located between lower wall 177 of housing 112 and recess 175 configured to receive the axle of tape measure 110. Curved walls 182 extend from the front portion of housing 112 adjacent to components of light system 24 (i.e., PCBA) to the rear portion of housing 112 where battery 174 is located. In a specific embodiment, one or more of curved walls 182 include an opening or gap 196 (i.e., curved walls 182 have two portions). Gap 196 is positioned generally below recess 175 with one portion of curved walls 182 extending toward the front portion of housing 112 and the other portion of curved walls 182 extending toward the rear portion of housing 112. In contrast to previously described curved walls of the wire retention system, curved walls 182 include a first end 198 and a second end 200 opposing the first end 198 do not include separate curved end pieces (see e.g., FIGS. 6-7). Applicant believes the wire retention system and curved walls maintaining durability or the tape measure and reduce manufacturing costs (i.e., fewer parts and easier assembly).

Wire retention system 178 further includes a plurality of channels 184 defined between the plurality of curved walls 182. Wires 180 are received within the plurality of channels 184 and extend between PCBA (see e.g., 58 in FIG. 7) and battery 174. Curved walls 182 include opposing inner surfaces 183 that face each other. Inner surfaces 183 of curved walls 182 include a plurality of retaining ribs 186. In a specific embodiment retaining ribs 186 have a curved or round shape. In other embodiments, retaining ribs 186 have a different shape (i.e., rectangular, ovular, polygonal). Retaining ribs 186 help to secure wires 180 within channels 184 during impact events or when housing 112 vibrates.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed:

1. A tape measure comprising:
a housing;
a reel rotatably disposed in the housing;
an elongate blade located within the housing and wound around the reel;
a retraction system coupled to the reel, wherein the retraction system drives rewinding of the elongate blade on to the reel; and
a lighting system comprising:
 a circuit board;
 a light source;
 a frame; and
 an optical component, the optical component at least partially surrounds the light source and is positioned between an outward facing surface of the frame and the circuit board;
 wherein the frame is configured to surround and support the circuit board, the light source and the optical component within the housing;
wherein the lighting system is configured to emit a light in a forward direction such that the lighting system acts as a flashlight.

2. The tape measure of claim 1, wherein the optical component is a reflector.

3. The tape measure of claim 2, wherein a full width at half maximum angle of the lighting system is between 20 degrees and 40 degrees.

4. The tape measure of claim 1, further comprising a rechargeable battery and wires that electronically couple the circuit board and the rechargeable battery.

5. The tape measure of claim 4, further comprising a wire retention system configured to retain the wires in a position against an inner surface of the housing.

6. The tape measure of claim 5, the wire retention system positioned below the reel, the wire retention system comprising:

curved walls with opposing inner surfaces; and
a channel defined by the curved walls, the channel configured to receive the wires.

7. The tape measure of claim 6, the wire retention system further comprising retaining ribs, the retaining ribs extend outward from the opposing inner surfaces of the curved walls such that the wires are held within the channel.

8. The tape measure of claim 1, the housing further comprising a recess on a front portion of the housing wherein the outward facing surface of the frame is positioned in the recess of the housing.

9. The tape measure of claim 1, wherein the frame is formed from a clear polycarbonate material.

10. A tape measure comprising:
a housing;
a reel rotatably disposed in the housing;
an elongate tape having gradation marks located within the housing and wound around the reel;
a tape port in the housing allowing for extension of the elongate tape away from the housing in a forward direction;
a spring coupled to the reel, wherein extension of the elongate tape causes rotation of the reel which tensions the spring storing energy within the spring and the spring releases energy driving the reel to retract and wind the elongate tape on the reel; and
a lighting system comprising:
a circuit board;
a light-emitting diode;
an optical component, the optical component at least partially surrounds the light-emitting diode; and
a holder, the holder configured to surround and support the circuit board, the light-emitting diode and the optical component within the housing;
wherein the lighting system emits a light in the forward direction and illuminates the elongate tape.

11. The tape measure of claim 10, wherein the optical component is a lens.

12. The tape measure of claim 11, wherein a full width at half maximum angle of the lighting system is between 10 degrees and 20 degrees.

13. The tape measure of claim 10, further comprising:
a rechargeable battery;
wires that extend between and electronically couple the circuit board and the rechargeable battery; and
a wire retention system configured to retain the wires in a position against an inner surface of the housing.

14. The tape measure of claim 13, the wire retention system positioned below the reel, the wire retention system comprising:
curved walls with opposing inner surfaces;
a channel defined by the curved walls, the channel configured to receive the wires; and
retaining ribs, the retaining ribs extend outward from the opposing inner surfaces of the curved walls such that the wires are retained within the channel.

15. The tape measure of claim 10, further comprising a lanyard attachment, the lanyard attachment positioned at a top, rear corner of the housing.

16. A tape measure comprising:
a housing comprising:
a recess on a front portion of the housing;
a body of the housing formed from a first material having a first durometer; and
a portion of the housing surrounding the recess is formed from a second material having a second durometer less than the first durometer;
an axle coupled to the housing;
a tape reel rotatably mounted within the housing around the axle and defining an axis of rotation, the tape reel comprising a radially outward facing surface;
an elongate tape blade wound around the radially outward facing surface of the tape reel;
a retraction system coupled to the tape reel, wherein the retraction system drives rewinding of the elongate tape blade on to the tape reel; and
a lighting system comprising:
a circuit board;
a light-emitting diode;
a frame; and
an optical component, the optical component at least partially surrounds the light-emitting diode and is positioned between an outward facing surface of the frame and the circuit board, the outward facing surface of the frame is positioned in the recess of the housing;
wherein the frame is configured to surround and support the circuit board, the light-emitting diode and the optical component within the housing.

17. The tape measure of claim 16, further comprising a rechargeable battery and wires that electronically couple the circuit board and the rechargeable battery, wherein the rechargeable battery includes a longitudinal axis parallel to the axle.

18. The tape measure of claim 17, further comprising an indicator light at least partially surrounded by the optical component, the indicator light configured to change colors depending on a charge level of the rechargeable battery.

19. The tape measure of claim 17, further comprising a wire retention system positioned along an inner surface of the housing, the wire retention system comprising:
curved walls with opposing inner surfaces;
a channel defined by the curved walls, the channel configured to receive the wires; and
retaining ribs, the retaining ribs extend outward from the opposing inner surfaces of the curved walls such that the wires are retained within the channel.

20. The tape measure of claim 16, wherein the second material is a thermoplastic rubber.

* * * * *